UNITED STATES PATENT OFFICE 2,175,082

STABILIZED SYNTHETIC RUBBERLIKE MATERIALS

Harro Hagen, Leverkusen-Kuppersteg, Ingofroh Dennstedt, Cologne-Buchforst, and Wilhelm Becker, Cologne-Mulheim, Germany, assignors to I. G. Farbenindustrie Aktiengesellschaft, Frankfort-on-the-Main, Germany No Drawing. Application December 24, 1937, Serial No. 181,604. In Germany December 24, 1936

9 Claims. (Cl. 260—94)

The present invention relates to a new process for stabilizing synthetic rubber-like materials prepared by polymerization of 1.3-dienes and to the stabilized compositions which are obtainable thereby.

It is known that synthetic rubber-like materials of the character described are liable to a self-hardening. This is probably due to a linking of the individual chains with the formation of cyclic compounds. In consequence of this "cyclicisation" the working of these products on the roller is connected with considerable difficulties and expenses and, moreover, the mechanical properties of the vulcanizates obtained therefrom are impaired. Apart from this phenomenon, the polymerizates of the character described show the undesired property of taking up oxygen from the air.

Many attempts have been made at the avoiding of these disadvantages by the addition of stabilizing agents. To this end there have been incorporated within the polymerizates of the character described aromatic secondary amines, polyvalent aromatic hydroxy compounds and finally aldehyde-amine-condensation products. All products of this type though exerting some stabilizing effect involve the disadvantage of impairing the stability towards light of the vulcanizates. In consequence thereof, no clear success has been reached up to the present time.

It is the object of our present invention to develop new auxiliary agents which show a good stabilizing action without impairing the fastness to light of the vulcanizates thus allowing the preparation of light-colored rubber materials.

We have found that the compounds which may be defined as sulfides of alkylated phenols meet every practical demand. The term "sulfide" is intended to include also polysulfides. These products can be prepared generally by causing an alkylated phenol to react with sulfur chloride or sulfur monochloride or by melting the alkylated phenols with free sulfur. The general methods of preparing these compounds are known per se, so that it is deemed unnecessary to explain them in detail. As alkylated phenols there are employed in the first line those which contain the alkyl group in p-position to the hydroxy group. Monosulfides or polysulfides of ortho, meta and para-kresols, of the various xylenols as well as of mono-, di- or trichlorinated products have proved to be suitable for the purpose in question. It is believed that the best stabilizers are the polysulfides of tertiary amylphenols.

As synthetic rubber-like materials which may be stabilized in accordance with the present invention there may be mentioned the polymerizates of butadiene, isoprene, dimethylbutadienes, 2-chlorobutadiene, and finally the products of the conjoint polymerization of such butadienes with other polymerizable substances such as styrene or acrylic acid nitrile. The incorporation of the stabilizers within these synthetic rubber-like materials can be effected in a solid state, for instance, on the roller. The simplest way is to add the stabilizers to the polymerizates obtained in form of a latex according to the emulsion polymerization.

The following examples illustrate the invention without, however, restricting it thereto the parts being by weight:

Example 1

A rubber prepared by the emulsion polymerization of a mixture of butadiene and acrylonitrile was worked up
(1) Without stabilization,
(2) With the addition of 3% of di-(tertiary-amyl-phenol)-disulfide,
(3) With the addition of 3% of phenyl-$\beta$-naphthylamine; the disulfide or the amine respectively was added to the latex as a 10% benzene solution. The working up of the latex was carried out by precipitating it with sodium chloride. These three samples of the same rubber were worked up as follows and vulcanized:

|  | Parts of |
|---|---|
| Polymerizate | 100.0 |
| Carbon black | 40.0 |
| Caoutchol (tar-distillation residues) | 10.0 |
| Zinc oxide | 5.0 |
| Sulfur | 1.0 |
| Benzothiazyl-2-sulphene-diethylamide | 1.0 | vulcanization: 40 minutes : 2.1 atmospheres superatmospheric pressure.

The physical data of the vulcanizates of the three different samples are given in the following table:

| Sample | Tensile strength* | Elongation | Permanent set | Elasticity * | Modulus at an elongation of 300%* | Hardness in degrees shore |
|---|---|---|---|---|---|---|
|  | Kg./cm² | Percent | Percent | Percent | Kg./cm² |  |
| 1 | 143 | 275 | 8 | 25 |  | 78 |
| 2 | 302 | 610 | 12 | 33 | 78 | 70 |
| 3 | 265 | 510 | 10 | 33 | 95 | 74 |

*Measured in the Schopper machine.

The example clearly shows that the vulcanizate of the unstabilized rubber does not yield satisfactory values for tensile strength, elongation, elasticity and hardness. The modulus at 300% elongation is not measurable, i. e. the rubber is cyclicized. This cyclicization is prevented by either of the stabilizing agents according to samples 2 and 3 while the low modulus number (78) of sample 2 shows the improved stabilization in comparison with sample 3 (95).

Example 2

The same experiment was repeated with a copolymerizate of butadiene and styrene which had been prepared by emulsion polymerization. As evident from the figures below a similar result was obtained:

| Sample | Tensile strength* | Elongation | Permanent set | Elasticity* | Modulus at an elongation of 300%* | Hardness in degrees shore |
|---|---|---|---|---|---|---|
| | $Kg./cm.^2$ | Percent | Percent | Percent | $Kg./cm.^2$ | |
| 1 | 104 | 220 | 13 | 20 | | 77 |
| 2 | 230 | 765 | 25 | 34 | 31 | 70 |
| 3 | 241 | 800 | 26 | 33 | 35 | 69 |

*Measured in the Schopper machine.

Example 3

To examine the discoloration of a white vulcanizate the same three precipitations as in Example 2 were mixed in the following way and vulcanized:

| | Parts of |
|---|---|
| Polymerizate | 100.0 |
| Zinc oxide | 10.0 |
| Titanium dioxide | 10.0 |
| Sulfur | 1.5 |
| Benzothiazyl-2-sulfene-diethylamide | 1.5 |
| Stearic acid | 2.0 |

Vulcanization: 60 minutes: 2.5 atmospheres superatmospheric pressure.

By this means no useful, i. e. pore-free material could be obtained from the unstabilized material. The vulcanizates 2 and 3 were white when prepared; the changes of color by the light of a 1000-watt-lamp at a distance of 40 cm. are shown in the following table:

| Sample | Time of exposure | | | |
|---|---|---|---|---|
| | 22 hours | 48 hours | 110 hours | 170 hours |
| 2 | White | White | White | Slightly changed. |
| 3 | Greyish-brown. | Brownish-black. | Black | Black. |

Example 4

A product of the emulsion polymerization of butadiene and acrylic acid nitrile has been worked up (1) Without stabilization,
(2) With the addition of 3% cresol sulfide prepared from 1 mol cresol and 1.1 mol of sulfur chloride and incorporated within the latex in form of a dilute sodium lye.

Mixture 2 yields on vulcanization a product which is considerably superior to the vulcanizate obtained from 1 as to tensile strength, elongation, elasticity and hardness.

An equal effect was obtained when working with xylenol-sulfides.

Example 5

A product of the emulsion polymerization of 2-chlorobutadiene has been worked up
(1) Without stabilization,
(2) With the addition of 3% diisobutylphenol sulfide incorporated within the latex in form of a 10% benzene solution.

Mixture 2 yields on vulcanization a product which is considerably superior to the vulcanizate obtained from 1 as to tensile strength, elongation, elasticity and hardness.

We claim:
1. The composition of matter comprising a butadiene-1.3 polymerisate and a sulfide of an alkylated phenol.
2. The composition of matter comprising a butadiene-1.3 polymerisate and a polysulfide of an alkylated phenol.
3. The composition of matter comprising a butadiene-1.3 polymerisate and a di-(tertiary-amyl-phenol) disulfide.
4. The composition of matter comprising a mixed emulsion polymerizate of butadiene-1.3 and styrene having incorporated therewith a sulfide of an alkylated phenol.
5. The composition of matter comprising a mixed emulsion polymerizate of butadiene-1.3 and styrene having incorporated therewith a polysulfide of an alkylated phenol.
6. The composition of matter comprising a mixed emulsion polymerizate of butadiene-1.3 and styrene and a di-(tertiary-amyl-phenol) disulfide.
7. The composition of matter comprising a mixed emulsion polymerizate of butadiene-1.3 and acrylic acid nitrile having incorporated therewith a sulfide of an alkylated phenol.
8. The composition of matter comprising a mixed emulsion polymerizate of butadiene-1.3 and acrylic acid nitrile having incorporated therewith a sulfide of an alkylated phenol.
9. The composition of matter comprising a mixed emulsion polymerizate of butadiene-1.3 and acrylic acid nitrile and a di-(tertiary-amyl-phenol) disulfide.

HARRO HAGEN.
INGOFROH DENNSTEDT.
WILHELM BECKER.